No. 876,879.
PATENTED JAN. 14, 1908.
R. H. HOWARD.
IRRIGATION GATE BOX.
APPLICATION FILED JUNE 27, 1907.
2 SHEETS—SHEET 1.
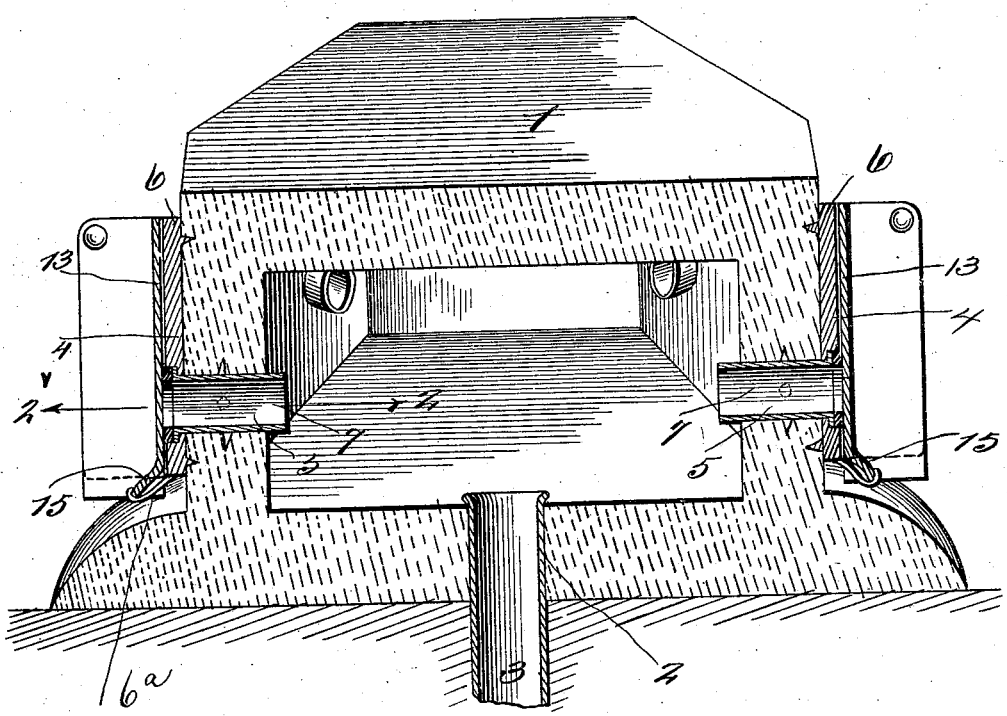
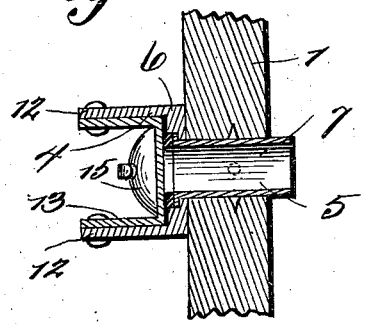
Witnesses
Inventor
R. H. Howard.
By Drew Swift
Attorney No. 876,879. PATENTED JAN. 14, 1908.
R. H. HOWARD.
IRRIGATION GATE BOX.
APPLICATION FILED JUNE 27, 1907.
2 SHEETS—SHEET 2.
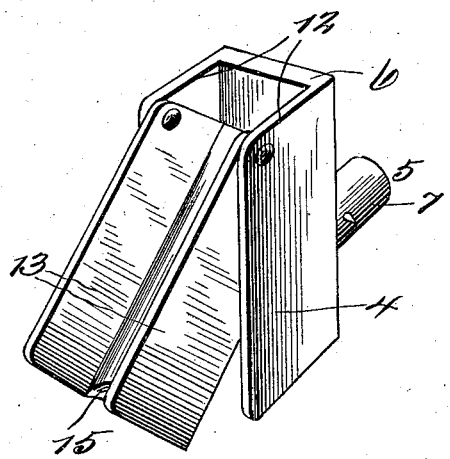
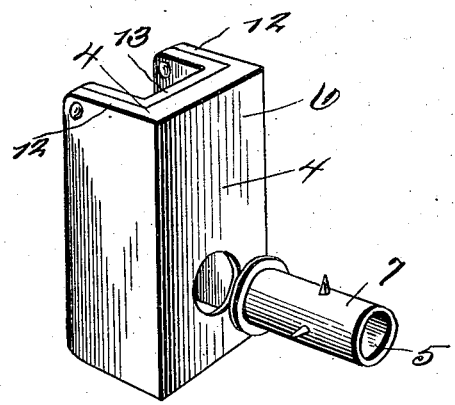
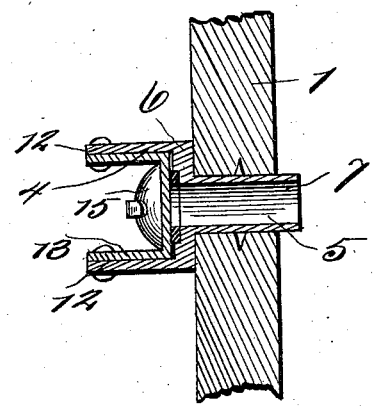
Witnesses
R. N. Boswell.
K. G. Whitcomb
Inventor
R. H. Howard.
By Dean Swift
Attorney

UNITED STATES PATENT OFFICE.

RILEY H. HOWARD, OF RIVERSIDE, CALIFORNIA.

IRRIGATION-GATE BOX.

No. 876,879.  Specification of Letters Patent.  Patented Jan. 14, 1908.

Application filed June 27, 1907. Serial No. 381,056.

*To all whom it may concern:*

Be it known that I, RILEY H. HOWARD, a citizen of the United States, residing at Riverside, in the county of Riverside and State of California, have invented certain new and useful Irrigation-Gate Boxes, of which the following is a specification, reference being had therein to the accompanying drawing.

This invention pertains to a new and useful cement irrigating gate box, preferably of octagon contour. The gate box of this particular design, is provided with inlets leading through its cement base, and outlets leading from the vertical surfaces of the box, there being as many outlets as desired, preferably six, so as to leave two sides of the octagon plain.

Any suitable number of irrigating gate boxes may be employed for the irrigation of the soil; these boxes being located preferably upon the higher soil so as to allow the outward flow of the water to spread, and to be equally distributed through the furrows of soil, that is, when the gates or shut-offs are open.

This invention comprises further objects and combinations of elements, which will be hereinafter more fully described, shown in the accompanying drawings, and the novel features thereof will be pointed out in the appended claims.

To obtain a full and correct understanding of the details of construction, combinations of features, elements and advantages, reference is to be had to the hereinafter set forth description and the accompanying drawings, in connection therewith, wherein, Figure 1 is a cross sectional perspective view of an irrigation gate box, to convey the contour of the said box. Fig. 2 is a sectional view on line 2—2 of Fig. 1. Fig. 3 is a perspective view, of the gate detached. Fig. 4 is a perspective view showing the pivoted member 13, closed, and viewing the rear face of the gate. Fig. 5 is a sectional view, showing a slightly modified form of gate.

Making renewed reference to the accompanying drawings, wherein similar reference characters indicate corresponding parts, in the several illustrations by figures, 1 designates a cement irrigation box, which may be of any desired contour preferably octagonal. This irrigating box may be located within gardens, orchards or fields of wheat or corn or any other field of product; there being as many irrigation boxes as desired, suitable for the area of the field or garden. These irrigation boxes are provided with an inlet 2, to which the water main 3 is connected, as will be understood from the drawings. Upon six of the plain faces of the octagon, is positioned a gate 4, designed for closing the outlet 5, which extends through the wall of the irrigation box. When these gates are open, the water may flow freely through the outlets, after which it will equally distribute itself through the area of the garden or field. These gates comprise a body portion 6 which is U-shaped in cross section, having fixed thereto a tubular shell 7; this shell is designed as shown, to be incased within the cement forming the wall of the irrigation box to prevent the displacement thereof.

As before stated the body portion is U-shaped in cross-section, and by this construction, flanges 12 are provided, between which, a pivoted member 13 is connected. This pivoted member is designed for the purpose of closing the outlet, of the irrigation box which outlet is formed by the said tubular shell. This pivoted member conforms to the shape of the body portion of the gate proper, and also frictionally engages with the flanges of the body portion, as will be clearly manifest. This pivoted member is provided on its free swinging end with a thumb or finger projection 15, so as to allow the pivoted member to be oscillated for the purpose of opening the outlet as will be clearly understood from the drawings.

The lower portion of the body portion 6, is provided with a spring engaging member 6ª, adapted for engagement with the finger projections 15 of the pivoted member 13, when the same is closed, so as to secure the said pivoted member against the pressure of water within the gate box. To release the projection 15, it is necessary to press the spring member downward, as will be clearly observed.

What is claimed by the protection of Letters-Patent, is,

1. In a device of the character described, the combination with an immovable channel member, having an open-ended tubular shell forming an outlet for the immovable member when used in connection with a cement irrigation box, of a pivoted member conforming to the shape of the immovable member for closing said outlet, said pivoted member designed to have a close contact with the said immovable member.

2. In a device of the character described, the combination with an immovable channel member, having an open-ended tubular shell forming an outlet for the immovable member when used in connection with a cement irrigation box, of a pivoted member conforming to the shape of the immovable member for closing said outlet, said pivoted member designed to have a close contact with said immovable member, said pivoted member having a projection used for opening the same.

3. A gate for cement irrigation boxes, comprising a U-shaped body member, having a tubular shell designed to be incased within the wall of said cement irrigation box, a pivoted member for closing the inlet to said box formed by the tubular shell, said pivoted member conforming to the shape of the body member.

4. A gate for cement irrigation boxes, comprising a U-shaped body member having a tubular shell designed to be incased within the wall of said cement irrigation box, a pivoted member for closing the inlet to said box formed by the tubular shell, said pivoted member conforming to the shape of the body member, said pivoted member having a projection used for opening the same, said U-shaped body member having a spring member to engage said projection, so as to secure the pivoted member against the pressure of water in the gate box.

5. In a gate for irrigation boxes, the combination with an immovable member having a tubular shell, designed to be incased in the wall of the irrigation box, of a pivoted member conforming to the shape of the immovable member for closing the tubular shell, said pivoted member having a projection, said immovable member having a spring member to engage said projection.

6. In a gate for irrigation boxes, the combination with an immovable member, having a tubular shell, of a pivoted closure for closing the tubular shell, said pivoted closure having a projection, said immovable member having a spring member to engage said projection so as to secure the pivoted closure against the pressure of water in the box.

In testimony whereof I hereunto affix my signature in presence of two witnesses.

RILEY H. HOWARD.

Witnesses:
L. B. SCRANTON,
H. L. VAN LOAN.